UNITED STATES PATENT OFFICE.

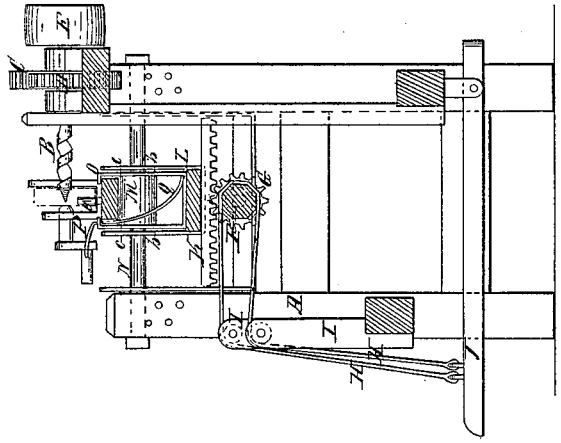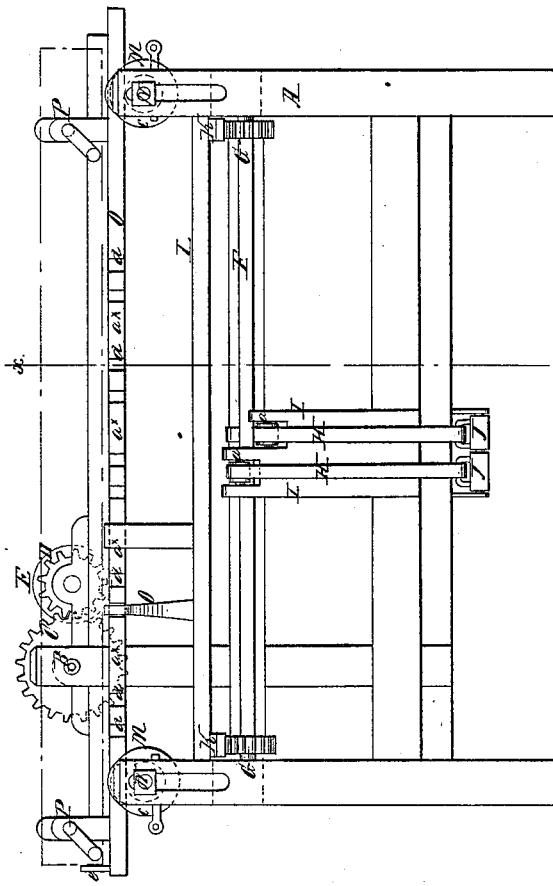

JOHN AGNEW, OF BATH, PENNSYLVANIA.

IMPROVEMENT IN MACHINES FOR BORING FENCE-POSTS.

Specification forming part of Letters Patent No. 51,676, dated December 26, 1865.

*To all whom it may concern:*

Be it known that I, JOHN AGNEW, of Bath, in the county of Northampton and State of Pennsylvania, have invented a new and Improved Machine for Boring Fence-Posts; and I do hereby declare that the following is a full, clear, and exact description thereof, which will enable those skilled in the art to make and use the same, reference being had to the accompanying drawings, forming part of this specification, in which—

Figure 1 is a front elevation of my invention; Fig. 2, a transverse vertical section of the same, taken in the line $x\ x$, Fig. 1.

Similar letters of reference indicate corresponding parts.

This invention relates to a new and useful machine for boring fence-posts; and it consists in the employment or use of a carriage arranged in such a manner that it may be readily moved toward and from the auger, the carriage being provided with a sliding gage, which is fitted on the carriage and has the post to be bored clamped to it, all being arranged in such a manner that the posts may be bored very accurately and with the greatest facility.

A represents a framing, which may be of rectangular form, and constructed in any proper manner to support the working parts; and B is an auger placed horizontally on the upper part of the framing A, and having a toothed wheel, C, upon it, into which a pinion, D, gears, the latter being on a shaft, A, having a pulley, E, upon it, around which the driving-belt passes.

In the framing A there is placed longitudinally a shaft, F, having upon it at each end a pinion, G. This shaft F has two straps, H H, attached to it, which pass around it in reverse directions, and pass over pulleys $a\ a$ in the upper ends of uprights I I, attached to the framing, and are connected at their lower ends to treadles J J.

The pinions G G gear into racks K K, which are attached to the bottom of a carriage, L, placed longitudinally in the framing A. This carriage has a roller, M, at each end of it, said rollers being between uprights $b\ b$, and having shafts N passing through them, which shafts are fixed, but may be adjusted higher or lower, and serve as guides for the carriage to move back and forth upon in a direction at right angles to the axis of the auger B. The rollers M are provided with flanges $c$, one at each end, and on these rollers a bar, O, is placed, the flanges $c$ retaining it in place. The bar O has two clamps, P P, attached to it, by which the part to be bored is firmly secured in position. The outer or front edge of the bar O is notched, as shown at $d$, the notches in the bar corresponding in position to the holes to be bored in the post.

Q is a spring-catch, attached to the framing A in such a position as to fit into the notches $d$ in the bar O and retain said bar and the fence-post in position while the latter is being bored, a stop, $e$, being secured to the bar O, against which one end of the post is placed previous to its being clamped in position. This stop serves as a guide or gage, and admits of the posts all being bored at the proper points, or at a uniform distance from one end.

It will, of course, be understood that the mortises of fence-posts are formed by boring a hole at each end of each mortise and then chiseling out the wood between the holes.

By referring to Fig. 1 it will be seen that the notches $d$ are made at such distances apart in the bar O as to hold the bar, and consequently the post secured to it, at points suitable to cause the holes to be bored at the proper points, the notches $d$, being in pairs, indicating the length of the mortises, while the spaces $a$ between the pairs indicate the distance between the mortises.

After the post is secured to the bar O and the catch Q fitted in the first notch, $d$, the operator, by depressing one of the treadles J, moves the carriage L toward the auger B, which bores a hole in the post. The other treadle is then depressed and the carriage moved back, so that the auger will be free from the hole, and the bar O is moved the distance of the adjoining notch and the carriage again moved forward to the auger and a succeeding hole bored, and so on till all of the holes in the post are bored.

In consequence of the bar O resting on the rollers M M it may be very readily shifted or moved, and in boring the posts they may be fitted to the bar at the termination of either movement of the same, as the boring may be commenced from either end of the post.

The device is exceedingly simple and efficient, and will perform its work rapidly and well.

Having thus described my invention, I claim as new and desire to secure by Letters Patent—

The post-borer constructed, as herein described, with sliding carriage L, notched bar O, clamp P, racks K, pinions G, straps H, and treadles J, all arranged to operate substantially as and for the purposes set forth.

JOHN AGNEW.

Witnesses:
  HENRY SCHOLL,
  JOSEPH DECH.